United States Patent
Todd

(10) Patent No.: US 7,072,615 B1
(45) Date of Patent: Jul. 4, 2006

(54) AUTOMATIC INSTALLATION PROCESS FOR WIRELESS COMMUNICATION SYSTEM

(75) Inventor: Robert Edmund Todd, Northumberland (GB)

(73) Assignee: Cedardell Limited, Northhumberland (GB)

(*) Notice: Subject to any disclaimer, the term of this patent is extended or adjusted under 35 U.S.C. 154(b) by 753 days.

(21) Appl. No.: 10/069,245

(22) PCT Filed: Jul. 19, 2000

(86) PCT No.: PCT/GB00/02777

§ 371 (c)(1),
(2), (4) Date: Jun. 6, 2002

(87) PCT Pub. No.: WO01/15112

PCT Pub. Date: Mar. 1, 2001

(30) Foreign Application Priority Data

Aug. 25, 1999 (GB) .............................. 9920015

(51) Int. Cl.
*H04B 7/00* (2006.01)

(52) U.S. Cl. .................. 455/41.2; 455/412.1; 455/423; 455/414.1; 455/557; 455/554.2; 455/403; 455/552.1; 700/224; 700/223; 709/227; 709/228; 709/208; 709/209; 370/465; 370/466; 370/467

(58) Field of Classification Search ............... 455/41.2, 455/557, 554.2, 552.1, 403, 412.1, 414.1; 700/224, 23; 709/227, 228, 208, 209
See application file for complete search history.

(56) References Cited

U.S. PATENT DOCUMENTS

| | | | | |
|---|---|---|---|---|
| 4,096,566 A | * | 6/1978 | Borie et al. .................. 710/110 |
| 4,356,547 A | * | 10/1982 | Barcaroli et al. ............. 712/34 |
| 4,366,535 A | * | 12/1982 | Cedolin et al. ............. 710/100 |
| 4,638,453 A | | 1/1987 | Gran et al. |
| 5,852,660 A | * | 12/1998 | Lindquist et al. ........... 379/230 |
| 5,953,655 A | * | 9/1999 | Oiwa ....................... 455/412.1 |
| 5,978,846 A | * | 11/1999 | Kimishima ................. 709/227 |
| 6,014,709 A | * | 1/2000 | Gulick et al. ............... 709/235 |
| 6,240,478 B1 | * | 5/2001 | Brickell ...................... 710/110 |
| 6,243,771 B1 | * | 6/2001 | Van Gasteren et al. ....... 710/59 |
| 6,351,633 B1 | * | 2/2002 | Meakes ...................... 455/403 |

FOREIGN PATENT DOCUMENTS

| | | |
|---|---|---|
| DE | 3337648 A1 | 2/1987 |
| DE | 19539259 A1 | 4/1997 |
| JP | 59128845 | 7/1984 |
| WO | WO 91/14244 | 9/1991 |
| WO | WO 99/11081 | 3/1999 |

* cited by examiner

*Primary Examiner*—Marceau Milord
(74) *Attorney, Agent, or Firm*—Beyer Weaver & Thomas, LLP

(57) ABSTRACT

A method of inserting a communications module (6) into a wireless communication system (1) comprising at least one control module (2) and a plurality of communications modules (3, 4, 5) is disclosed. The system (1) is adapted to transmit messages either directly or indirectly between modules and each module is adapted to receive a wireless message and transmit a wireless message to a further communications module or to a control module. The communications module (6) is inserted into the system (1) and transmits a first signal in a set-up mode. If the first signal is detected by at least one pair of modules (2, 3, 4, 5), the communications module (6), by means of a signal from a control module (2), is installed to communicate directly with the two modules of at least one pair of modules.

9 Claims, 4 Drawing Sheets

AUTOMATIC INSTALLATION PROCESS FOR WIRELESS COMMUNICATION SYSTEM

The present invention relates to a method of inserting communications modules into a wireless communication system having at least one control module and a plurality of communications modules, wherein the system transmits wireless either directly or indirectly between pairs of said modules. The invention relates particularly, but not exclusively, to a method of inserting communications modules into a system in which a high degree of reliability is required, such as in a security or fire alarm system.

Wireless communications systems are known in which one or more control modules transmit wireless messages around the system, either directly or indirectly, via successive radio frequency communications modules, each of which is designed to receive a message and transmit the message onwards in the system and is allocated a predetermined position in the order of message transmission. This enables wireless messages to be relayed across relatively large distances without the need for high powered transmitters, which in certain countries are subject to fairly stringent licensing requirements.

Known communications systems of this type suffer from the drawback that if one of the communications modules is moved, reliability of signal transmission paths around the system can no longer be relied upon, or the communications modules must be re-configured, which is a considerably time consuming process. Also, if a new communications module is inserted into the system, it is a fairly laborious process to re-configure the other units in the system (i.e. re-allocate their positions in the order of message transmission) in order to take account of the new unit. In particular, in broadcast systems it is usually necessary to program into the new unit system numbers, unit numbers, type identifiers and so on. The programming of these parameters is relatively difficult for untrained personnel, thus increasing the cost and difficulty of operating the system. These numbers are sometimes inserted by means of software, but most often by means of a series of switches (of which there are usually 8 or 16), each of which needs to be set in one of two positions by personnel. This clearly makes setting up the system more labour intensive and therefore increases its cost.

Preferred embodiments of the present invention seek to overcome the above disadvantages of the prior art.

According to an aspect of the present invention there is provided a method of inserting a communications module into a wireless communication system comprising at least one control module and a plurality of communications modules, wherein the system is adapted to transmit messages either directly or indirectly between modules, and wherein each said first communications module is adapted to receive a wireless message and transmit said message to a further communications module or to a said control module and is programmed with a respective address identifying modules with which it communicates messages directly when in a communication mode, the method comprising:

(i) causing a said communications module to be inserted into the system to transmit a first signal in a set-up mode; and (ii) if said first signal is detected by at least two said modules capable of communicating directly with each other, causing said second communications module, by means of a second signal from at least one said control module updating the address of one of said modules which detected said first signal, to be installed to communicate directly, when in said communication mode, with two said modules which detected said first signal, including the module whose address was updated by said second signal.

This provides the advantage that the system can be automatically configured as each module is added to the system in such a way that reliability of communication links is maximised. In addition, the advantage is provided that difficult procedures such as programming in system numbers and the like are avoided as this can be carried out automatically by the system of the invention.

In a preferred embodiment, the step of the step of causing said communications module to be inserted to communicate directly with the two modules comprises updating the address of said modules adapted to transmit messages in the system subsequently to the communications module to be inserted.

In a preferred embodiment, said addresses are consecutively numbered, and said updating step comprises incrementing the numbers of the addresses of said modules adapted to transmit messages in the system subsequently to the communications module to be inserted.

The method may further comprise the step of testing reliability of communications links between said communications module to be inserted and the two modules with which it is to communicate directly when in said communication mode.

Said step of testing reliability preferably comprises exchanging at least one message between said communications module to be inserted and said two modules.

According to another aspect of the invention, there is provided a method of method of automatically setting up a wireless communication system comprising at least one control module and a plurality of communications modules, wherein the system is adapted to transmit messages either directly or indirectly between modules, and wherein each said communication module is adapted to receive a wireless message and transmit said message to a further communications module or to a said control module and is programmed with a respective address identifying modules with which it communicates messages directly when in a communication mode, the method comprising:

(i) causing a first communications module to transmit a first signal in a set-up mode;

(ii) if said first signal is received by at least one said control module, causing said first communications module, by means of a second signal from a said control module which received said first message, to communicate in said communication mode directly with said control module which received said first message;

(iii) causing a second communications module to transmit a third signal in a set-up mode;

(iv) if said third signal is detected by said first communications module and said control module which received said first message, causing, by means of a fourth signal from said control module, said second communications module to communicate directly with the first communications module and said control module, and said first communications module to communicate directly with said second communications module, in said communication mode.

The method may further comprise the step of inserting at least one further communications module according to a method as defined above.

The method preferably further comprises the step of testing reliability of communications links between modules intended to communicate directly with each other.

The method may further comprise the step of changing the or each said communications module from said set-up mode to said communications mode by means of a signal from at least one said control module.

This provides the advantage of enabling the system to automatically make itself ready to communicate wireless messages when the communications modules have been inserted.

As an aid to understanding the invention, a preferred embodiment thereof will now be described, by way of example only and not in any limitative sense, with reference to the accompanying drawings, in which.

Figure 1:
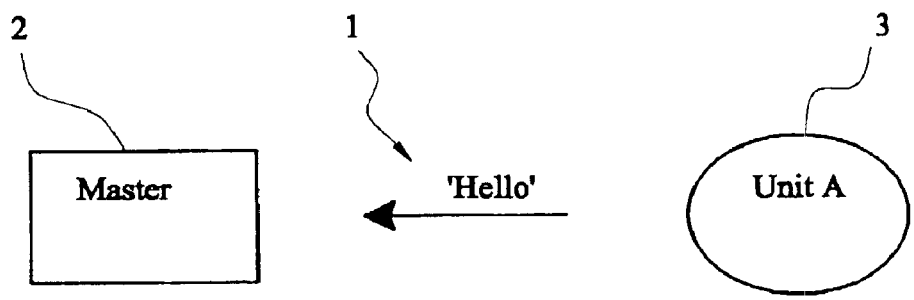
FIG. 1 shows a first step in a process embodying the present invention for introducing a first communications module into a wireless communication system.

Referring to FIG. 1, a wireless communication system 1 such as a security system or fire alarm system initially comprises a master unit 2 comprising a control module, and a first communications module 3. The process of installing the communications module 3 in the system 1 is begun by switching the master unit 2 to its auto install mode. The first communications module 3 is then switched on, and the switching on of the communications module 3 automatically causes that module to go into its auto install mode. As a result, the first module 3 transmits a "Hello" message containing information identifying the first module 3.

Figure 2:
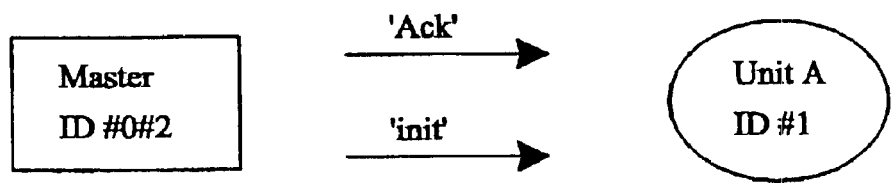
FIG. 2 shows a subsequent step to the step of FIG. 1.

If the master unit 2 receives the "Hello" signal from the first module 3, it responds with an "Ack" (acknowledgement) message, followed by an "init" (initialisation) message (FIG. 2). The initialisation message initialises new communications modules (such as the first module 3) as they are installed in the system to give them a unique ID number reflecting their position in the system (i.e. the other modules in the system with which they exchange messages directly).

All communications modules in the system 1, and the master unit 2, have a unique ID number, but the master unit 2 has an additional ID number, i.e. the master unit 2 has ID numbers #0 and a further number equal to the number of communications modules in the system 1 plus 1. This reflects the fact that the master unit 2 is both the beginning and the end of the chain if communication in the system 1. In the arrangement shown in FIG. 2, therefore, assuming that no other communications modules 3 are already installed in the system 1, the first module 3 is initialised as ID #1.

Figure 3:
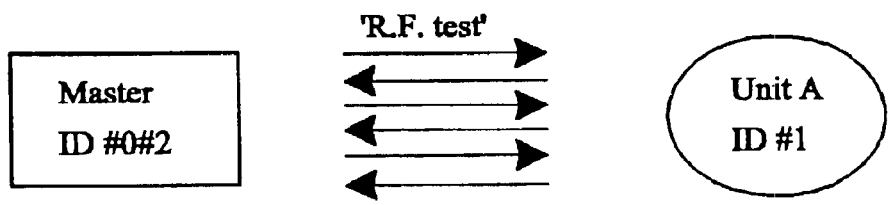
FIG. 3 shows a subsequent step to the step of FIG. 2.
Figure 4:
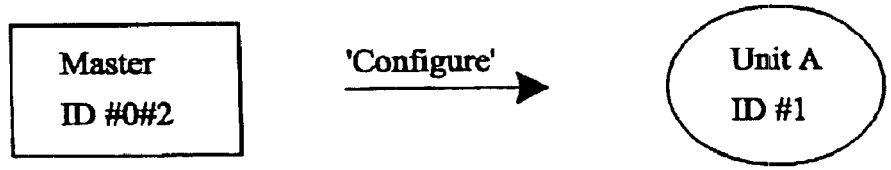
FIG. 4 shows a subsequent step to the step of FIG. 3.

As shown in FIG. 3, the master unit 2 then tests the reliability of the communication link between itself and the first communication module 3 by repeatedly transmitting a radio frequency message to the first module 3, which is then transmitted back to the master unit 2. In order for the test to be successful, the message must be reliably exchanged a predetermined number of times, or the first module 3 is not installed. If the test is successful, on the other hand, the master unit 2 sends a configuration message (FIG. 4) to the first module 3 to configure the function of the unit. If this process is successfully completed, the first module 3 is then installed and the master unit 2 can reliably transmit to and receive messages from the first module 3.

Figure 5:
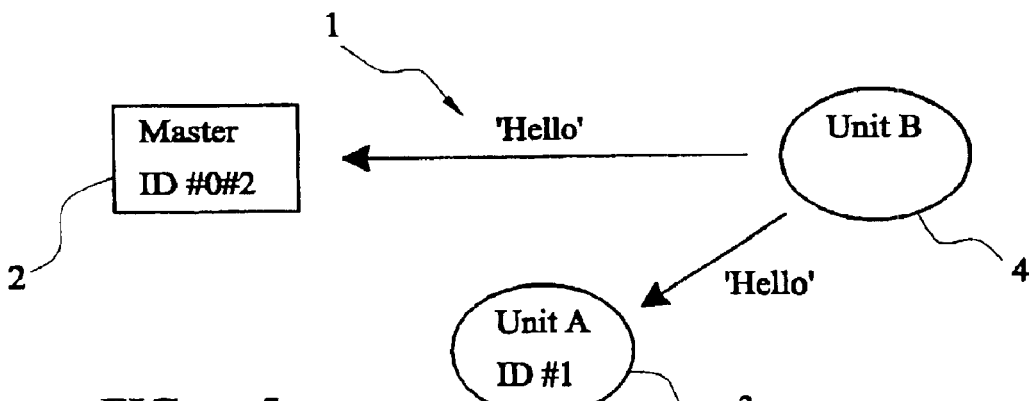
FIG. 5 shows a first step in inserting a second communications module into the system of FIGS. 1 to 4.
Figure 6:
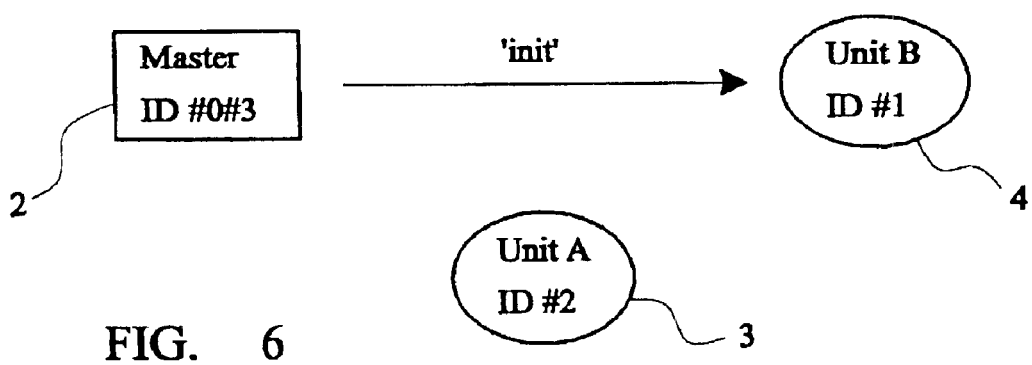
FIG. 6 shows a subsequent step to the step of FIG. 5.

Referring to FIG. 5, the second communications module 4 to be installed in the system 1 is then switched on, as a result of which it automatically enters its auto install mode and transmits a "Hello" message, in a manner similar to the first module 3. If the "Hello" message is received by the master unit 2 and the first module 3, the second module 4 is automatically installed in a manner similar to the first module 3 and is initialised with ID #1. This causes the master unit 2 to have ID #0 and ID #3, and the ID of the first module 3 is incremented to ID #2 (FIG. 6).

Figure 7:
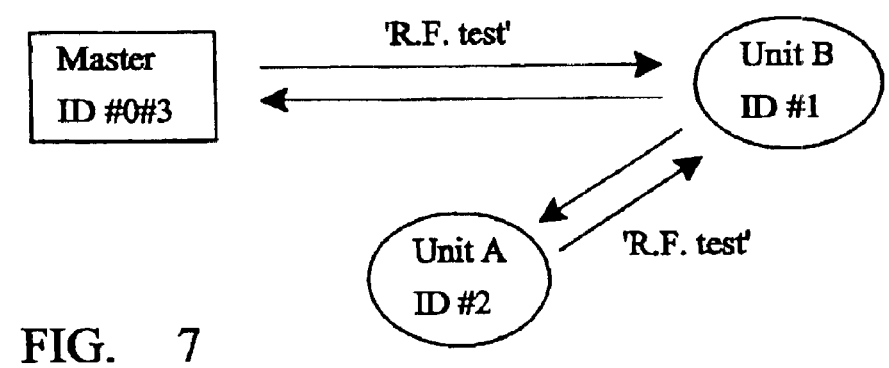
FIG. 7 shows a subsequent step to the step of FIG. 6.
Figure 8:
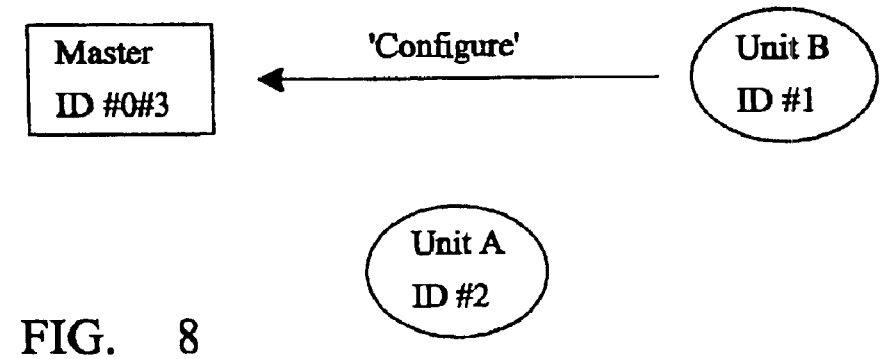
FIG. 8 shows a subsequent step to the step of FIG. 7.
Figure 9:
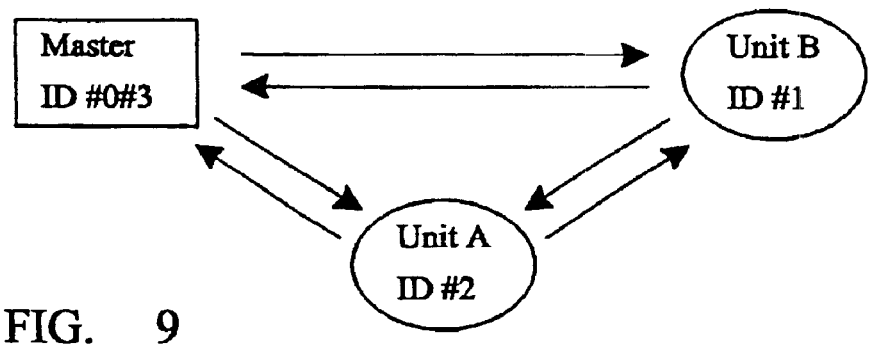
FIG. 9 shows the communication system in which the master unit, first unit and second unit are inserted.

The second module 4 is installed between the master unit 2 and the first module 3 as ID #1 because it is known to be able to communicate directly with these two neighbouring units. The reliability of the radio frequency communications links between the second module 4 and the master unit 2, and between the first module 3 and second module 4 is then tested (FIG. 7). If this test is successfully carried out, the master unit 2 configures the second module 4 in a manner similar to the first module 3 as shown in FIG. 8, and the system 1 is then as shown in FIG. 9 in which each of the master unit 2 and communications modules 3,4 can communicate directly with the other two. If, on the other hand, the second module 4 is out of radio range of either the master unit 2 or the first module 3, the "Hello" message is not detected by both the master unit 2 and first module 3, as a result of which the second module 4 is not installed.

Figure 10:
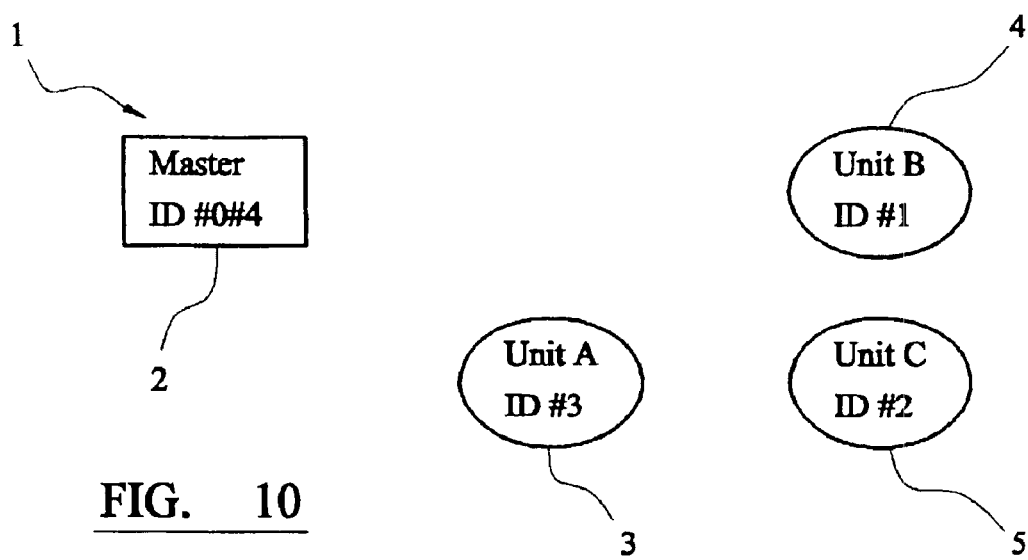
FIG. 10 shows a first step in inserting a third communications module into the system of FIGS. 1 to 9.

Referring now to FIG. 10, when a third module 5 to be installed is switched on, it transmits a "Hello" signal in a similar manner to the first 3 and second 4 modules. This "Hello" signal must be heard by two other units 2,3 or 4, or the third module 5 will not be installed. If the "Hello" message is received by the first and second modules 3,4 but not by the master unit 2, the third unit 5 is installed between those modules as ID #2, since it is known that the third module 5 can communicate directly with both of those modules. The master unit 2 and first module 3 then increment their ID numbers. The reliability of the radio frequency communication link between the third module 5 and the first and second modules 3,4 is then carried out, and the third module 5 configured if the test is successful.

Figure 11:
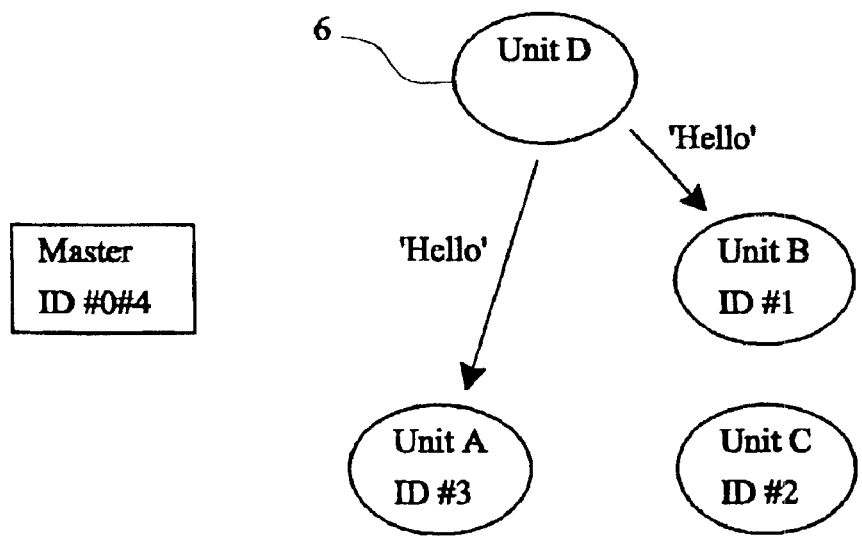
FIG. 11 shows a subsequent step to the step of FIG. 10.
Figure 12:
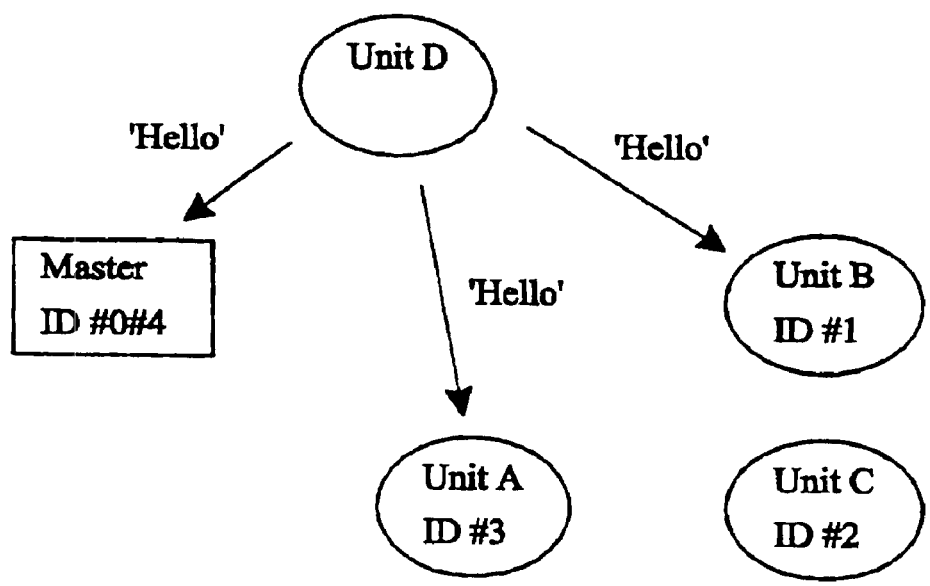
FIG. 12 shows an alternative step to the step of FIG. 11.
Figure 13:
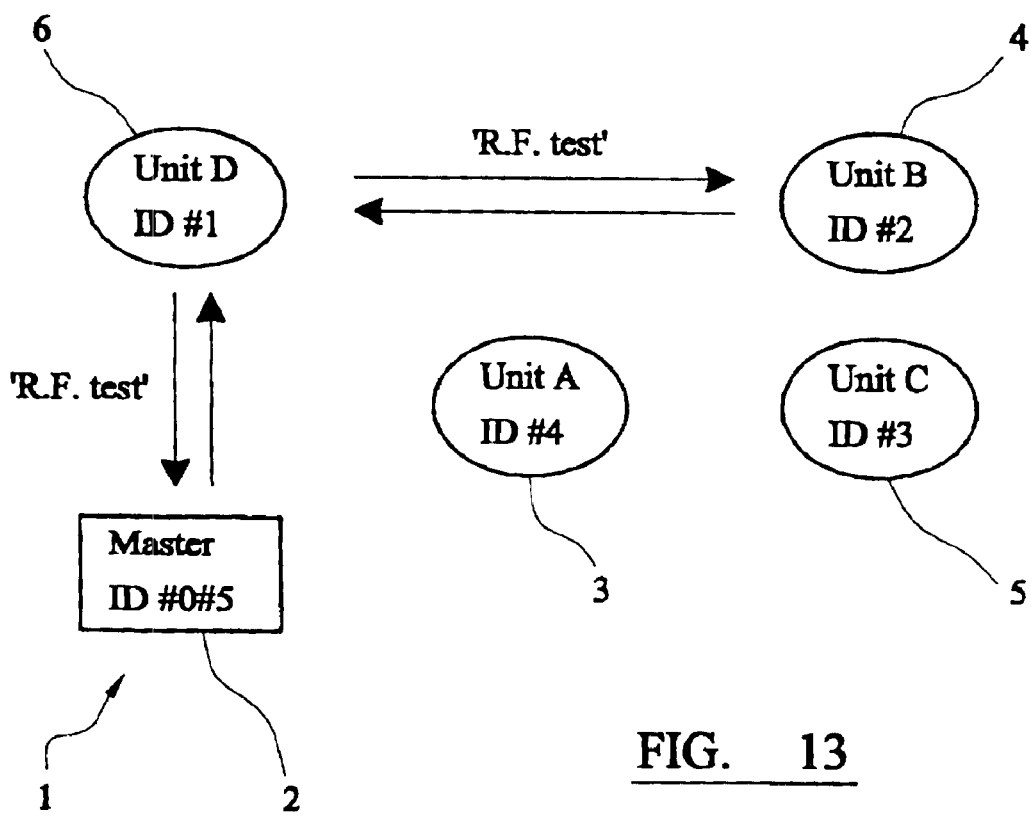
FIG. 13 shows a step in which the radio frequency communications links of the system of FIGS. 10 to 12 are tested.

Referring now to FIG. 11, when a fourth module 6 to be installed is switched on (and therefore automatically enters its auto-install mode), it transmits a "Hello" message which must be received by at least two units having consecutive ID numbers (i.e. two units which can communicate directly with each other), otherwise it will not be installed. For example if the "Hello" message is received by the second module 4 (ID #1) and the first module 3 (ID #3) only, it will not be installed (FIG. 11). If, on the other hand, the "Hello" message from the fourth module 6 is received by two units having consecutive ID numbers, it will be installed between these two units, as shown in FIG. 12. If more than one pair of units having consecutive ID numbers detects the "Hello" message, the fourth module 6 is installed between the pair of consecutively numbered units having the lowest ID numbers. For example, if the "Hello" message is received by the master unit 2 and the first 3 and second 4 communications modules, the fourth module 6 is installed between the master unit 2 and second unit 4 with ID #1.

When the fourth module 6 has been initialised with an ID number, the reliability of the radio frequency communication links to that module 6 is tested in the manner described earlier. When the module 6 has then been configured, it is successfully installed, and additional modules can then be installed in an analogous manner. The system 1 can revert to its communication mode.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method of inserting a communications module into a wireless communication system comprising at least one control module and a plurality of first communication modules, wherein the system is adapted to transmit messages either directly or indirectly between modules, and wherein each said first communications module is adapted to receive a wireless message and transmit said message to a further first communications module or to a said control module, and is programmed with respective addresses identifying modules with which it communicates messages directly when in a communication mode, the method comprising:

(i) causing a second communications module, which is to be inserted into the system, to transmit a first signal in a set-up mode; and (ii) if said first signal is directed by at least two said modules capable of communicating directly with each other, causing said second communication module, by means of a second signal from at least one said control module updating the address of one of said modules which detected said first signal, to be installed to communicate directly, when in said communication mode, with two said modules which detected said first signal, including the module whose address was updated by said second signal.

2. A method according to claim 1, wherein the step of causing said communications module to be inserted to communicate directly with said two modules comprises updating the address of said modules adapted to transmit messages in the system subsequently to the communications module to be inserted.

3. A method according to claim 2, wherein said addresses are consecutively numbered, and said updating step comprises incrementing the numbers of the addresses of said modules adapted to transmit messages in the system subsequently to the communications module to be inserted.

4. A method according to claim 1, further comprising the steps of testing reliability of communications links between said communications module to be inserted and the two modules with which it is to communicate directly when in said communication mode.

5. A method according to claim 4, wherein the step of testing reliability comprises exchanging at least one message between said communications module to be inserted and said two modules.

6. A method of automatically setting up a wireless communication system comprising at least one control module and a plurality of communications modules, wherein the system is adapted to transmit messages either directly or indirectly between modules, and wherein each said communications module is adapted to receive a wireless message and transmit said message to a further communications module or to a said control module, and is programmed with a respective address identifying modules with which it communicates message directly when in a communication mode, the method comprising:

(i) causing a first communications module to transmit a first signal in a set-up mode;

(ii) if said first signal is received by at least one said control module, causing said first communication module, by means of a second signal from a said control module which received said first message, to communicate in said communication mode directly with said control module which received said first message;

(iii) causing a second communications module to transmit a third signal in a set-up mode;

(iv) if said third signal is detected by said first communications module and said control module which received said first message, causing, by means of a fourth signal from said control module, said second communications module to communicate directly with the first communications module and said control module, and said first communications module to communicate directly with said second communications module, in said communication mode.

7. A method according to claim 6, further comprising the step of inserting at least one further communications module by means of a method according to claim 1.

8. A method according to claim 6, further comprising the step of testing reliability of communications links between modules intended to communicate directly with each other.

9. A method according to claim 6, further comprising the step of changing the or each said communication module from said set-up mode to said communicates mode by means of a signal from at least one said control module.

* * * * *